UNITED STATES PATENT OFFICE 2,160,632

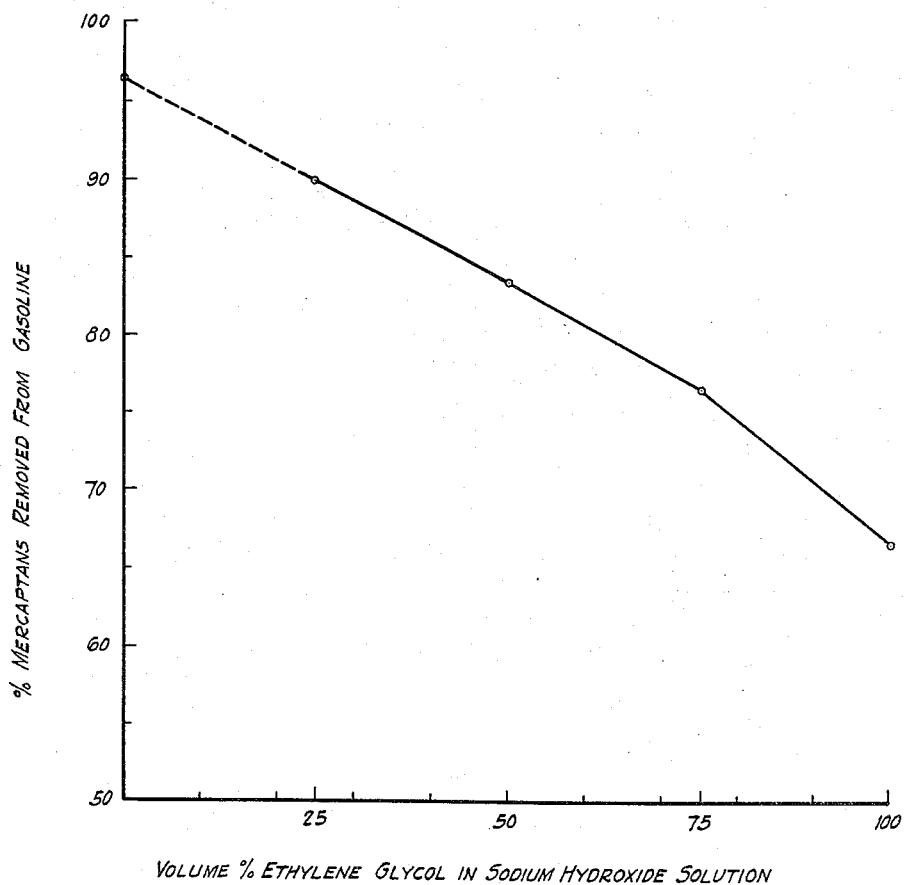

PROCESS FOR REMOVING ACID COMPONENTS FROM HYDROCARBON SOLUTIONS

David Louis Yabroff, Berkeley, and Ellis R. White, Albany, Calif., assignors to Shell Development Company, San Francisco, Calif., a corporation of Delaware Application May 7, 1937, Serial No. 141,358

2 Claims. (Cl. 196—32)

This invention relates to the removal of weakly acid-reacting organic substances from solutions in hydrophobe organic liquids and in particular deals with the removal of mercaptans from petroleum distillates.

It is frequently necessary to eliminate small quantities of organic acidic components such as mercaptans and phenols, etc., from their solutions in organic liquids. By hydrophobe organic liquids, as herein referred to, are meant hydrophobe normally liquid organic substances which are neutral or slightly basic, such as the liquid hydrocarbons derived from petroleum, benzene, toluene, xylene, substituted normally liquid hydrocarbons which are substantially insoluble in water, for instance, chlorinated hydrocarbons, of which chlorethane, ethylene dichloride, trichlorethylene, carbon tetrachloride, chloropropane, chlorbutylene, chlorbenzene, brombenzene, are examples; or nitro hydrocarbons, for example, nitroethane, nitrobenzene; or other nitrogen containing hydrocarbons such as amyl or higher amines, aniline, quinoline, petroleum bases, etc.

In the U. S. Patent 2,059,075, by Yabroff and Givens, it was shown that the efficacy of the removal of acidic organic substances from their solution in hydrocarbon type liquids by means of alkaline-reacting solutions which are substantially immiscible with said liquids, depends largely on the solvent power of the alkaline solution for the organic acids and on the alkalinity of the former. As a means for producing aqueous alkaline solutions of good solvent power for organic acids the use of quaternary ammonium bases was suggested. The addition of certain polyhydroxy alcohols, not including ethylene glycol and glycerin, was disclosed in the Yabroff application, Serial Number 102,893, filed September 28, 1936. Ethylene glycol and glycerin were excluded as being unsuited for the raising of the solvent power of aqueous alkali hydroxide solutions for mercaptans, since it had been found that under the conditions set forth in said Yabroff application, ethylene glycol and glycerin not only failed to raise the solvent power of the alkali hydroxide solution but actually lowered it.

Now we have discovered that if an aqueous ethylene glycol solution is substantially saturated with caustic alkali a solution is obtained which has good extraction power for organic weakly acidic compounds as mercaptans and the like.

We use the term caustic alkali to designate strong alkaline bases, i. e., the alkali metal and ammonium hydroxides, alkaline earth hydroxides, quaternary ammonium bases, alkali carbonates and bicarbonates, etc., although the hydroxides of the alkali metals are preferred. Especially useful are the sodium and potassium hydroxides as being the strongest of the easily available bases.

It has already been proposed to use saturated substantially anhydrous solutions of caustic alkali in ethylene glycol. We have found, however, that caustic alkali are soluble in anhydrous ethylene glycol to a very limited extent only and that considerably greater quantities of caustic alkali can be dissolved in ethylene glycol which contains substantial amounts of water. The solubilities of sodium hydroxide in ethylene glycol of varying contents of water were found to be as follows:

Saturation values of NaOH in aqueous ethylene glycol solutions at 20° C.

| Percent ethylene glycol | NaOH normality |
|---|---|
| 100 | 1.2 |
| 75 | 3.3 |
| 50 | 5.8 |
| 25 | 9.9 |
| 0 | 19.0 |

The effect of the greater concentration of alkali hydroxide which saturated ethylene glycol solutions containing relatively large amounts of water can hold, is that the extraction efficiencies of the saturated solutions increase with increasing contents of water. In the attached drawing the amount of mercaptans removed from a California gasoline distillate by treating same with saturated sodium hydroxide solutions in ethylene glycol is shown. As may be seen the extraction efficiency decreases with increasing ethylene glycol content.

Thus from the point of view of extraction efficiency alone it would appear that the best results are obtained in the complete absence of ethylene glycol. However, substantially saturated alkali hydroxide solutions in the absence of ethylene glycol have the serious disadvantage of being very poor solvents for the alkali salts of the organic acids, the high concentrations of alkali hydroxide having a salting out effect on the salts, so that the latter form a separate solid phase which frequently causes considerable difficulties. Substantially saturated alkali metal hydroxides are very viscous and difficult to handle even in the absence of a solid phase, and under such circumstances a plugging up of valves, lines, filters, etc., is more or less unavoidable. For this reason it is advantageous to sacrifice a certain amount of extraction efficiency for the sake of preventing the precipitation of salts of the weak organic acids.

We have found that, in general, saturated alkali hydroxide solutions containing not less than about 25% ethylene glycol are free from this objectionable precipitation of salts, and yet possess extraction efficiencies which are not greatly diminished.

The exact amount of ethylene glycol which is required fully to prevent this precipitation varies considerably with the nature of the acidic compounds absorbed, the type of alkali hydroxide and the concentration of salts which it is desired to hold in solution, more ethylene glycol usually being required to dissolve relatively large amounts of the salts. It may become necessary to use as much as 50 or 75% of ethylene glycol although in general we prefer to use lowest concentrations which successfully prevent precipitation of the salts. In no instance has it been found necessary to use aqueous ethylene glycol of more than about 75% concentration.

When herein speaking of concentration of ethylene glycol we mean to refer to the ratio of ethylene glycol to water, independent of the amount of alkali hydroxide added. Thus a saturated alkali hydroxide solution containing, for instance, 50% ethylene glycol indicates a solution which contains an equal volume of water and ethylene glycol and which is saturated with the alkali hydroxide.

Regeneration of the spent alkali hydroxide solution containing salts of organic acids can be had if the treatment is restricted to the removal of mercaptans. This can be achieved by removing other acid components obtained in the hydrocarbon type liquid by subjecting same to suitable pretreatment, such as fractional distillation, treatment with tripotassium phosphate, sodium arsenite, sodium carbonate, ethanol amine, dilute alkali hydroxide of the type of sodium hydroxide or lime water, etc. After removal of acids other than mercaptans, mercaptans are then extracted with a saturated alkali metal hydroxide solution in aqueous ethylene glycol, as hereinbefore described, under conditions to form two layers, a treated hydrocarbon type liquid layer and an alkali hydroxide solution containing mercaptides. The mercaptide solution is then steamed to drive off the mercaptans, or oxidized to convert them to disulfides which can be separated from the remaining solution by skimming, decanting, centrifuging etc.

Oxidation is most easily carried out with air in the presence of an oxidizing catalyst capable of promoting the oxidation of mercaptides to disulfides, such catalysts being, for instance, the sulfides or oxides of lead, copper, cobalt, nickel, etc.

We claim as our invention:

1. In the process of separating organic acid-reacting substances contained in a water-insoluble neutral or basic organic liquid, the step comprising treating said liquid with an aqueous solution of ethylene glycol containing not less than about 25% water, which solution is substantially saturated with an alkali metal hydroxide, the amount of ethylene glycol in said solution being sufficient to prevent salting out of the alkali metal salts of said acid-reacting substances from the solution.

2. In the process of separating mercaptans contained in a hydrocarbon liquid, the step comprising treating said liquid with an aqueous solustion of ethylene glycol containing not less than about 25% water, which solution is saturated with an alkali metal hydroxide, the amount of ethylene glycol in said solution being sufficient to prevent salting out of alkali metal mercaptides from the solutions.

DAVID LOUIS YABROFF.
ELLIS R. WHITE.